March 28, 1961   J. M. HOLAHAN, JR   2,977,065
DRAG FOR FISHING REELS
Filed Dec. 24, 1957   2 Sheets-Sheet 1
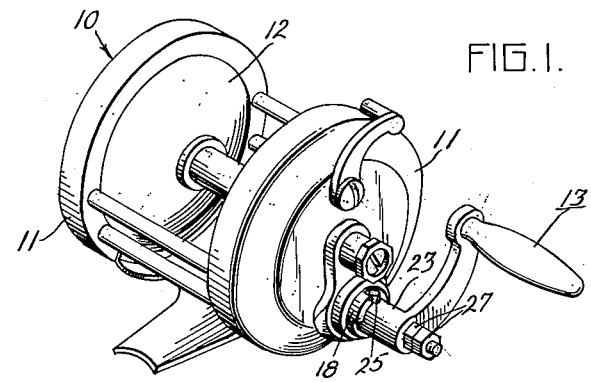
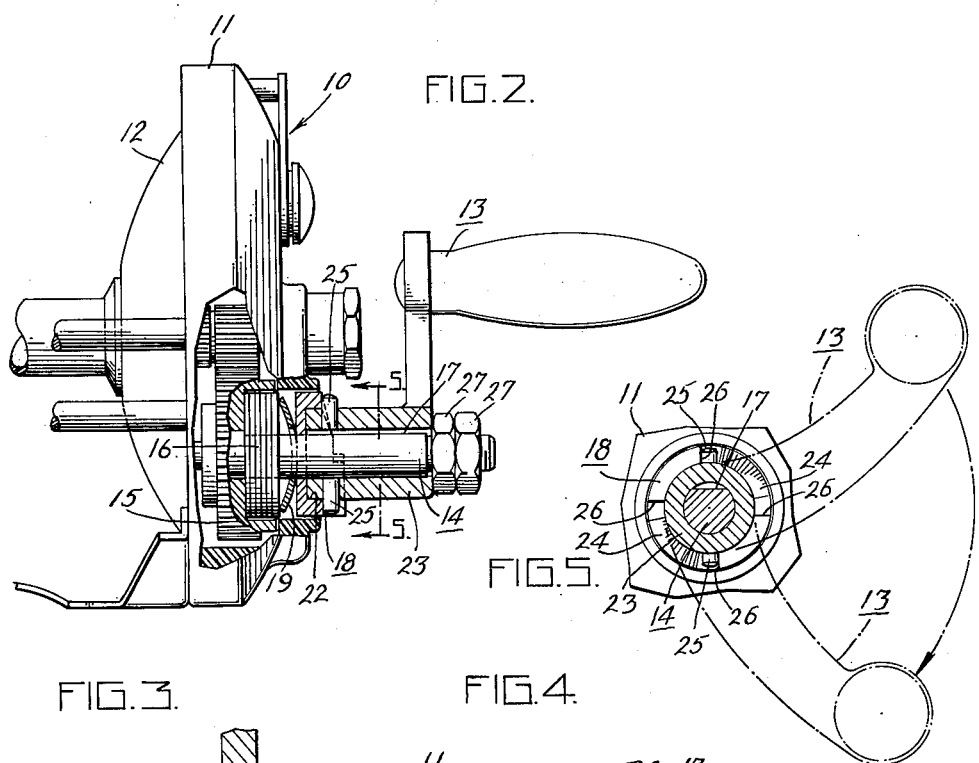
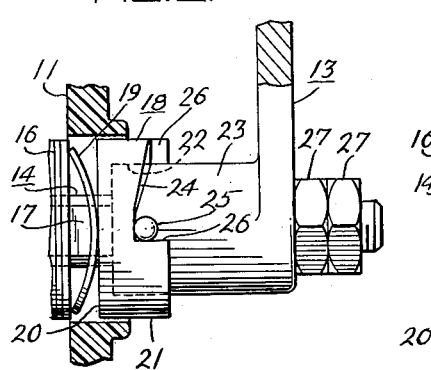
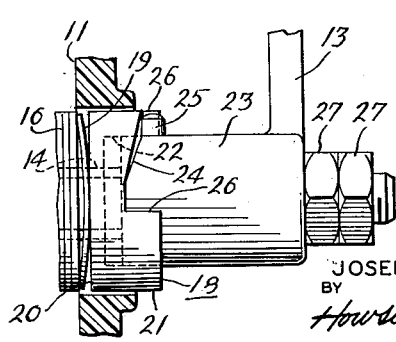
INVENTOR:
JOSEPH M. HOLAHAN, JR.
BY
Howson & Howson
ATTYS.

March 28, 1961   J. M. HOLAHAN, JR   2,977,065
DRAG FOR FISHING REELS
Filed Dec. 24, 1957   2 Sheets-Sheet 2
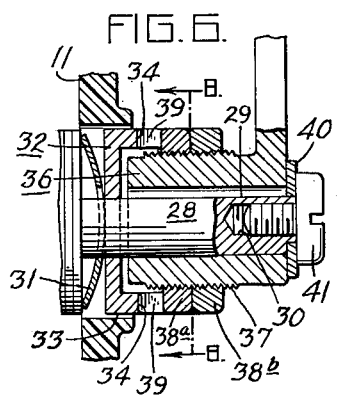
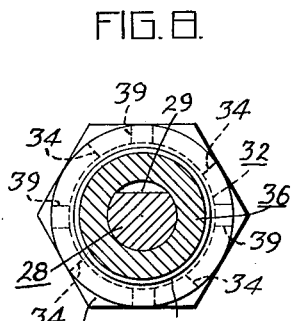
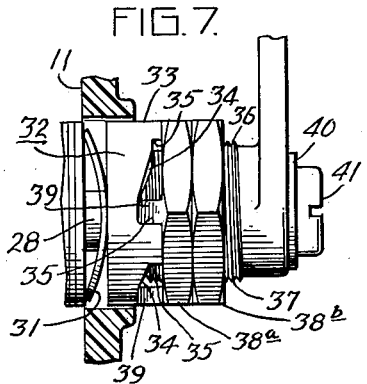
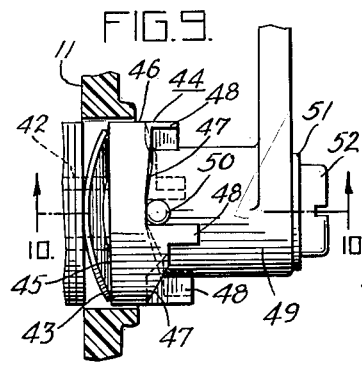
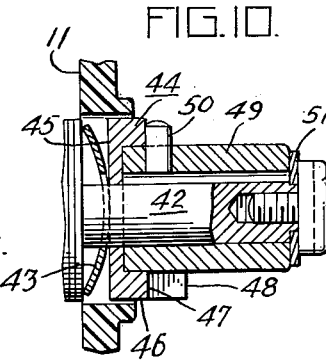
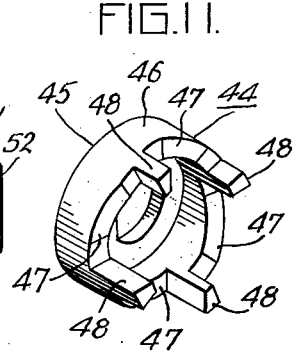
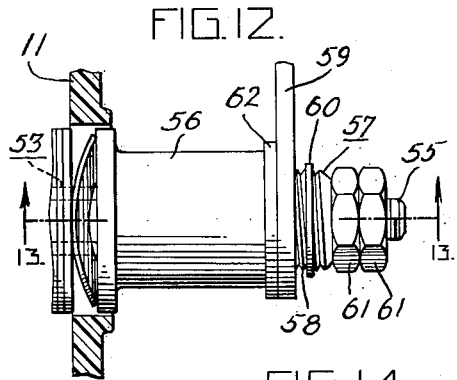
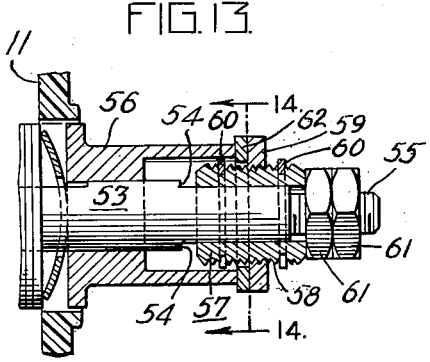
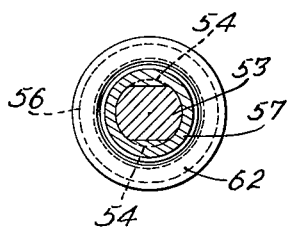
INVENTOR:
JOSEPH M. HOLAHAN, JR.
BY Howson & Howson
ATTYS.

United States Patent Office 2,977,065
Patented Mar. 28, 1961

2,977,065

DRAG FOR FISHING REELS

Joseph M. Holahan, Jr., Abington, Pa., assignor to True Temper Corporation, a corporation of Ohio Filed Dec. 24, 1957, Ser. No. 705,038

1 Claim. (Cl. 242—84.54)

The present invention relates to new and useful improvements in drags for fishing reels and more specifically to drag actuating mechanism wherein rotary movement of the winding handle controls the amount of drag exerted on the drag mechanism and wherein repositioning of a mechanical element of the drag actuating mechanism determines the amount that the drag range can be varied.

The drag actuating mechanism of the present invention is designed to overcome one of the inherent limitations found in prior reels of the above type; that is inability to effect a convenient instantaneous change in drag while using the reel. In accordance with the present invention a mechanism for governing drag is provided whereby the user by varying the position of the winding handle has a fluctuating drag range at his command.

With the foregoing in mind the principal object of the present invention is to provide a drag actuating mechanism wherein the pressure exerted axially inward on the drag mechanism is determined by the force exerted in producing the rotary movement of the winding handle.

Another object of the present invention is to provide a drag actuating mechanism wherein drag range can be changed by repositioning certain mechanical elements in the drag actuating mechanism.

A further object of the present invention is to furnish a novel drag actuating mechanism which may be manufactured easily and economically and can effectively and efficiently be adapted to presently existing fishing reels.

These and other objects of the present invention and the various features and details of the operation and construction thereof are hereinafter more fully set forth and described with reference to the accompanying drawings, in which;

Fig. 1 is a perspective view of a fishing reel embodying the present invention;

Fig. 2 is an enlarged fragmentary elevational view of the fishing reel of Fig. 1 partially in section illustrating the drag actuating mechanism of the present invention;

Fig. 3 is an enlarged fragmentary view of the drag mechanism of Fig. 1 showing the position of minimum drag on the spool of the reel;

Fig. 4 is a view similar to Fig. 3 portraying the position of the maximum drag on the spool of the reel;

Fig. 5 is a sectional view on line 5—5 of Fig. 2 illustrating the handle being moved to a position to increase drag on the spool;

Fig. 6 is an enlarged fragmentary sectional view of another embodiment of drag actuation mechanism of the present invention;

Fig. 7 is a side view of the embodiment of Fig. 6;

Fig. 8 is a sectional view on line 8—8 of Fig. 6;

Fig. 9 is a side view of still another embodiment of drag actuating mechanism of the present invention;

Fig. 10 is a sectional view on line 10—10 of Fig. 9;

Fig. 11 is a perspective view of the cam collar of the drag mechanism of Figs. 9 and 10;

Fig. 12 is a side view of another embodiment of drag actuating mechanism of the present invention;

Fig. 13 is a sectional view on line 13—13 of Fig. 12; and

Fig. 14 is a sectional view on line 14—14 of Fig. 13.

Referring more specifically to the drawings and particularly Figs. 1 and 2 thereof reference numeral 10 designates generally a conventional fishing reel comprising a pair of side plates 11, 11, a spool 12 and a handle 13 for causing rotation of the spool 12 and also for actuating the drag mechanism. The drag mechanism which is of the conventional type is shown in Fig. 2 and incorporates a drive shaft 14 rotatably journaled in one side plate of the reel, which in turn mounts a gear 15 on the inner end thereof. A plurality of drag washers 16 are located about the shaft in engagement with one face of the gear and upon exertion of pressure axially inward on the drag washers 16, a drag is exerted on the spool 12. The shaft 14 is of generally circular cross section and has a flat portion 17 extending longitudinally thereof for the major portion of its length. The shaft 14 terminates in a threaded portion of reduced diameter at its extreme outer end. The plurality of drag washers are of conventional construction, with alternate washers being interconnected with the gear and rotatable therewith, while the remaining washers are rotatable with the shaft 14.

In accordance with the present invention a collar 18 is slidably mounted on the flattened portion of the shaft 14 in engagement with the outer face of a spring washer 19 for rotation with the shaft 14. The spring washer 19 in turn, is positioned in engagement with the outermost drag washer 16 so that inward movement of the collar 18 causes pressure to be exerted axially inward on the drag washers through the spring washer. The collar 18 comprises a flat base portion 20 extending radially of the shaft 14 which terminates at its outer end in a circumferential wall portion 21 coaxial with the shaft 14 and extending outwardly toward the outer end of the shaft 14 to form a socket-like opening 22 within the collar. Means are provided for actuating the collar 18 axially of the shaft upon rotation of the winding handle 13 to exert pressure on the drag washers 16 and exert a drag on the spool 12. To this end a hub 23 which may be formed integrally with the handle 13 is rotatably mounted on the shaft 14 and received within the socket-like recess 22 in the collar 18 defined by the circumferential wall 21. Cooperating cam and cam followers are provided between the collar 18 and the hub 23 to cause axial movement of the collar 18 upon rotary movement of the hub 23. In the present instance the cooperating cams and cam followers comprise a pair of cam surfaces 24, 24 diametrically spaced apart on the outer circumferential wall of the collar and a pair of pins 25, 25 positioned on the hub to coact with the cam surfaces. As shown in Fig. 5 the cam faces may extend thru arcs of approximately 90° and the high points on the cam may be spaced approximately 180° apart with each cam surface terminating in outwardly projecting shoulders 26, 26 at its opposite ends. The pins projecting radially from the hub 23 are adapted to be moved within limits defined by the shoulders 26, 26 on the collar 18 in engagement with the cam surfaces.

As the handle is turned in the clockwise direction relative to Fig. 5, which is also the direction of rotation of the handle 13 for winding the line on the spool, the pins or cam followers 25, 25 move along the surface of the cam faces from the low point on the cam which is the position of minimum drag for the setting shown in Fig. 3 to the high point on the cam, the position of maximum drag shown in Fig. 4. Thence the hub 23 and the collar 18 move as a unit with the shaft 14, the hub 23 being restrained from further rotary movement with respect to the collar 18 and shaft 14 by engagement of the pins with the retaining shoulders 26, 26 on the collar. The above described movement of the pins 25, 25 along the cam surface of the collar 18 advances the collar axially inward against the spring washer 19 and in turn against the drag washers 16 thereby increasing the amount of pressure exerted on the drag washers 16 and consequently resulting in an increased drag on the spool of the reel. With a reverse turning of the handle 13 the pins 25, 25 move away from the high point on the cam toward the low point permitting movement of the collar 18 axially outward with respect to the drag washers 16 and resulting in a decreased drag on the spool of the reel. During this reverse rotation of the handle, the shaft 14 is prevented from rotating by means of conventional anti-reverse mechanism (not shown).

Another important feature of the present invention is the provision of means to adjust the drag exerted on the spool 12 upon movement of the handle 13. This may be accomplished by securing the handle 13 and hub 23 to the shaft 14 for limited adjusting movement axially with respect to the shaft 14. To this end a pair of adjustable lock nuts 27, 27 are threaded to the outer end of the shaft 14 in engagement with the outermost portion of the hub 23.

Movement of the lock nuts 27, 27 relative to the shaft 14 effects a change in drag range since the collar 18 which ultimately controls the amount of pressure exerted on the drag mechanism moves within newly determined limit positions. Thus in order to increase the maximum and minimum limits of the drag range the lock nuts 27, 27 are advanced inward along the shaft 14 which in turn effects a corresponding movement of the hub 23 with respect to said shaft. Advancing the hub 23 in turn necessitates an increased travel of the collar 18 along the shaft before the high point on the cam, the position of maximum drag for a setting is realized. Therefore the pressure axially inward is increased by an amount proportionate to the amount the lock nuts 27, 27 are advanced. To decrease the drag range the lock nuts 27, 27 are threaded outward, thereby reducing by a proportionate amount the maximum limit of the range of movement of the collar upon actuation of the handle.

Figs. 6 to 8 illustrate another embodiment of the present invention which comprises a shaft 28 of generally circular cross section having a flat portion 29 extending longitudinally thereof and a threaded opening 30 in the extreme outer end. A spring washer 31 is positioned about the shaft in engagement with the outermost drag washer. A collar 32 having a configuration similar to the collar 18 of the first embodiment is mounted on the shaft 28 for axial movement thereon. The collar 32 has an outer circumferential wall 33 coaxial with the shaft with a plurality of symmetrical cam surfaces 34, 34 formed on the outer face of said wall. As shown in Fig. 7 the cam surfaces 34, 34 may be spaced in each quarter of the periphery of the circumferential wall 33 with each cam surface terminating in outwardly projecting shoulders 35, 35 at its opposite ends. A hub 36 which may be formed integrally with the handle is disposed about the outer end of the shaft 28 and is operable upon rotary movement with respect to the shaft to cause pressure to be exerted on drag washers. The outer circumferential surface of the hub is threaded as indicated at 37 and adjustably mounts thereon a pair of threaded nut members 38a, 38b. The inner nut 38a has a plurality of lugs 39 extending from its inner face toward the cam faces of the collar and the outer nut 38b is disposed on the hub in engagement with the inner nut and serves as a lock nut to prevent movement of the inner nut 38a along the threaded sleeve during use. As shown in this particular embodiment the nut members may be of hexagonal shape and the lugs 39 may be spaced apart at approximately 90° intervals. A suitable washer 40 and machine screw 41 threadedly received in the outer end of the shaft 28 hold the handle in place on the shaft.

As the handle 13 is turned in the clockwise direction as viewed from the right of Fig. 7, the cam followers on the inner nut 38a are moved along the surface of the cam from the lowest point to the uppermost point on the cam thereby inducing axial movement of the collar member 32, inwardly along the shaft and resulting in an increase in drag. Continued rotation of the handle 13 causes the collar 32 and the hub member 36 to move as a unit with the shaft, the nut member being restrained from further rotary movement with respect to the shaft by the engagement of the lugs 39, 39 on the nut and the corresponding shoulders on the collar. As the handle 13 is turned in the opposite direction the nut member is caused to move toward the lower surface of the collar thereby decreasing drag on the spool.

The drag range in this particular embodiment can be varied by relocation of the nut members 38a, 38b with respect to the hub 36. Thus as the nut members 38a, 38b are advanced along the hub 36 an increase in drag range maximum is realized since the collar 32 is actuated to a position more proximate the drag washers. Conversely when the nut members are moved axially outward along the hub 36, the distance between the collar and drag washers is decreased by an amount proportionate to the amount the nut members were displaced and thus the maximum pressure which may be exerted axially inward on the drag washers is decreased.

Figs. 9 to 11 show still another embodiment of the present invention. The mechanism consists of a shaft 42 similar to the shaft member 14 set forth in the embodiment of Fig. 6 and a spring washer 43 annularly disposed on the shaft adjacent the drag washers. Slidably mounted on the shaft is a collar 44 having a flat base portion 45 extending radially of the shaft and terminating at its outer end in a circumferential wall portion 46 coaxial with the shaft extending outwardly toward the outer end of the shaft. Circumferential wall 46 has a plurality of graduated cam surfaces 47, 47 formed on the outer face of said wall. As shown in Fig. 11 each cam surface 47 begins and terminates in a flat perpendicular to a shoulder or lug 48 separating adjacent cam surfaces; with each cam surface spaced a different distance from the inner end of the collar 46. A hub 49 similar to the hub set forth in the embodiment of Fig. 1, has a pin 50 extending transversely from its outer circumference which is adapted to be positioned relative to the collar so that the pin can be moved into engagement with any one of the graduated cam surfaces. A washer 51 held in place by a machine screw 52 secures the handle to the shaft.

When the handle is turned in the clockwise direction as viewed from the right of Fig. 9, the cam follower or pin 50 is moved radially along the cam surface of the collar. The collar 44 being restrained from rotary movement with respect to the shaft by virtue of the keyed relation of the shaft and said collar, is moved axially inward along the shaft 42 a predetermined distance as defined by the cam contour and a resulting increase in drag is realized. Movement of the handle in the reverse direction causes a decrease in drag since the collar is permitted to move axially outward when the pin is urged toward a low point on the cam.

The drag range can be varied by repositioning of the pin 50 to move within any one of the cam surfaces 47, 47. The resultant variation in range is affected by virtue of said relocation since the collar 44 is advanced by the amount as determined by the sector in which the cam follower is disposed.

Figs. 12 to 14 exhibit still another form of the present invention. A drive shaft 53 extending laterally from the side plate of the reel is of circular cross section at its inner extremity. A pair of parallel longitudinal flats are formed on the shaft at its outer end commencing in radially spaced shoulder portions or abutments 54, 54.

The shaft 53 terminates in a threaded portion 55 of reduced diameter at its extreme outer end.

A tubular collar member 56 is positioned over the inner end of the shaft and is adapted to be forced into pressure applying relationship with the drag washers to exert the desired amount of drag on the spool. To this end a hub member 57 keyed for axial movement along the outer end of the shaft is threaded on its outer periphery 58 to accommodate rotary movement of a handle member 59 which is threadedly mounted thereon. A pair of snap rings 60, 60 located on the ends of the hub member define the limits within which the handle member can be moved laterally with respect to the hub 57. A pair of lock nuts 61, 61 threadedly received by the outer end of the shaft limit axial movement of the hub along the shaft between the shoulders 54, 54 and the inner end of the lock nuts 61, 61. A washer member 62 is positioned about the hub member intermediate the collar and the handle member.

As the handle 59 is rotated in the clockwise direction, which is also the direction of rotation of the handle for winding the line on the spool, the handle is caused to travel axially inward along the hub member until it engages the inner snap ring. During axial movement of the handle, the inner surface of the handle engages the washer 62 and causes the washer to force the collar inwardly thereby increasing the amount of drag on the spool. Reverse rotation of the handle permits lateral movement of the collar outward along the shaft and a corresponding reduction in drag.

Drag range can be varied as in the first embodiment by relocating the lock nuts 61, 61 along the shaft, since as a result of said movement, the limits within which the handle can be moved to regulate drag are relocated by an amount proportionate to repositioning of said lock nuts.

From the foregoing it will be apparent that the embodiments shown in the present invention provide a novel improvement of the drag mechanism for fishing reels wherein the drag on the line may be varied by movement of the winding handle which in turn imparts axial movement to associated members of the drag actuation mechanism and results in providing a drag range that can be readily adapted to any maximum or minimum degree. In addition it will be apparent that the invention provides a novel improvement in the drag actuation mechanism which is of relatively simplified construction, is easy to use and may be manufactured easily and cheaply.

While particular embodiments of the present invention have been illustrated and described herein, it is not intended to limit the invention to such a disclosure and changes and modifications may be incorporated and embodied therein within the scope of the following claim.

I claim:

In a fishing reel having a pair of end plates rotatably mounting therebetween a spool with a shaft drivably connected to the spool operable to cause rotation of the spool and pressure actuated drag mechanism positioned about the shaft operable to exert a drag on the spool upon application of pressure on the drag mechanism in a direction axially inward of the shaft, comprising; a collar slidably mounted on the shaft adjacent said drag mechanism and operable to exert pressure on said drag mechanism in a direction axially inward of said shaft, said collar having an outer circumferential wall with a series of cam surfaces spaced thereon, each of said surfaces extending laterally outward in graduated steps, means restraining said collar from rotation relative to said shaft, a hub rotatably positioned about the shaft extending partially within said cirmumferential wall and having at least one pin extending transversely of the outer circumference of the hub in engagement with the collar, a handle positioned about the shaft and connected with the hub to cause rotation of said hub upon rotation of said handle, said pin operable upon rotation of the handle in one direction to move along one of said cam surfaces to thereby cause the collar to be moved axially inward along the shaft and operable during rotation of the handle in the opposite direction to move in an opposite direction along said one of said cam surfaces whereby the collar may be moved axially outward along the shaft, and adjustable means for positioning the pin within any one of the graduated cam surfaces to thereby provide a range over which drag can be varied.

References Cited in the file of this patent

UNITED STATES PATENTS

| 1,114,716 | Annable | Oct. 27, 1914 |
| 1,981,429 | Scott | Nov. 20, 1934 |
| 2,162,774 | Coxe | June 20, 1939 |
| 2,896,874 | Nurmse | July 8, 1959 |

FOREIGN PATENTS

| 4,876 | Great Britain | 1910 |
| 589,703 | France | Feb. 26, 1925 |